US00RE35123E

United States Patent [19]

Wagner

[11] E Patent Number: Re. 35,123

[45] Reissued Date of Patent: Dec. 19, 1995

[54] VEHICLE BODY MOUNT

[76] Inventor: Frank Wagner, 19790 Huntington, Harper Woods, Mich. 48225

[21] Appl. No.: 370,260

[22] Filed: Jan. 9, 1995

Related U.S. Patent Documents

Reissue of:

[64] Patent No.: 5,178,433
Issued: Jan. 12, 1993
Appl. No.: 061,206
Filed: Jun. 12, 1987

[51] Int. Cl.[6] ..... B62D 27/04

[52] U.S. Cl. ..... 296/35.1; 403/224

[58] Field of Search ..... 296/35.1, 190; 403/224, 227, 351; 248/634, 635, 638, 632; 267/292, 293, 294

[56] References Cited

U.S. PATENT DOCUMENTS

| | | | |
|---|---|---|---|
| 2,020,869 | 11/1935 | Bassett | 403/351 X |
| 2,976,080 | 3/1961 | Moore | 296/35.1 |
| 3,177,032 | 4/1965 | Jaskowiak | 296/35.1 |
| 3,193,237 | 7/1965 | Adams | 296/35.1 |
| 3,218,101 | 11/1965 | Adams | 296/35.1 |
| 3,622,194 | 11/1971 | Bryk | 296/35.1 |
| 3,809,427 | 5/1974 | Bennett | 296/34.1 |
| 4,043,585 | 8/1977 | Yamanaka | 296/35.1 |
| 4,286,777 | 9/1981 | Brown | 296/35.1 |
| 4,405,256 | 9/1983 | King, Jr. | 403/224 |
| 4,720,075 | 1/1988 | Peterson et al. | 296/35.1 |
| 4,783,039 | 11/1988 | Peterson et al. | 296/35.1 X |
| 4,921,203 | 5/1990 | Peterson et al. | 296/35.1 X |
| 5,170,985 | 12/1992 | Killworth et al. | 296/35.1 X |

*Primary Examiner*—Russell D. Stormer
*Attorney, Agent, or Firm*—Gifford, Krass, Groh, Sprinkle, Patmore, Anderson & Citkowski

[57] ABSTRACT

A vehicle body mount assembly comprising an upper sheet metal spacer member, a lower sheet metal spacer member, and a sheet metal clip member. The upper sheet metal spacer member includes a flange portion having a central aperture and a tubular portion extending downwardly from the flange portion in coaxial relation to the central aperture and including a radially inwardly extending lip adjacent the lower end thereof. The lower spacer member includes a flange portion having a central aperture and a tubular portion extending upwardly from the flange portion in coaxial relation to the central aperture thereof and sized to be received telescopically within the upper spacer member tubular portion. The clip member is split and is sized to fit snappingly over and encircle a reduced diameter annular seat defined on the upper end of the lower spacer member tubular portion and includes prongs struck radially outwardly therefrom for snapping coaction with the lip on the upper spacer member tubular portion in response to relative axial telescoping movement of the upper end of the lower spacer member tubular portion into the lower end of the upper spacer member tubular portion.

6 Claims, 3 Drawing Sheets

VEHICLE BODY MOUNT

Matter enclosed in heavy brackets [ ] appears in the original patent but forms no part of this reissue specification; matter printed in italics indicates the additions made by reissue.

BACKGROUND OF THE INVENTION

This invention relates to means for mounting a vehicle body on a vehicle frame.

Vehicle bodies are commonly mounted on vehicle frames by the use of a body mount including a pair of uper and lower resilient blocks and a pair of upper and lower sheet metal spacer members each having a generally planar flange portion and an integral elongate tubular portion. The resilient blocks are positioned on upper and lower sides of the vehicle frame in alignment with and opening in the frame, the tubular portions of the sheet metal spacer members are respectively inserted in a central opening in a respective resilient block, and the inboard ends of tubular portions are secured together to respectively secure the resilient blocks to upper and lower sides of the vehicle frame.

A vehicle body mount of this general type is disclosed in U.S. Pat. No. 3,809,427 to Bennett. In Bennett, the tubular portion of the upper spacer member is provided with a reduced diameter section nearest the lower free end of the tubular portion and the tubular portion of the lower spacer member is of a small enough diameter to be telescopically received within the reduced diameter lower section of the tubular portion of the upper spacer member. During assembly, a special staking gun is required to provide a compressive force upon the spacer members and the resilient blocks and cause the free end of the tubular portion of the lower spacer member to flair outwardly into locking engagement with the shoulder created by the changing diameter of the tubular portion of the upper spacer member. Whereas this body mount structure has proven to be generally satisfactory, it requires the use of a special staking gun to accomplish the mounting operation, and this gun adds significantly to the cost of the assembly operation since the gun represents an item of capital investment, represents repair and maintenance expense, and consumes precious and expensive space along the assembly line.

SUMMARY OF THE INVENTION

This invention is directed to the provision of a vehicle body mount assembly that allows the body mount to be assembled in a production line environment with a minimum of unskilled effort and without the aid of any special tools.

The vehicle body mount assembly according to the invention includes an upper sheet metal spacer member, a lower sheet metal spacer member, and a sheet metal clip member. The upper sheet metal spacer includes a flange portion having a central aperture and a tubular portion extending downwardly from the flange portion in coaxial relation to the central aperture and having radially inwardly extending lip means adjacent the lower end thereof. The lower sheet metal spacer member includes a flange portion having a central aperture and a tubular portion extending upwardly from the flange portion in coaxial relation to the central aperture and size to be received telescopically within the tubular portion of the upper spacer member. The metal clip member is generally circular and is sized to fit over and encircle the upper end of the tubular portion of the lower spacer member and includes catch means projecting radially outwardly therefrom for snapping coaction with the lip means on the tubular portion of the upper spacer member in response to relative axial, telescopic movement of the upper end of the tubular portion of the lower spacer member into the lower end of the tubular portion of the upper spacer member. This arrangement provides an inexpensive and effective means of securing the resilient blocks to the upper and lower sides of the vehicle frame without the use of any special tools.

According to a further feature of the invention, the clip member is split to facilitate placement over the upper end of the tubular portion of the lower spacer member.

According to a further feature of the invention, the lower spacer member tubular portion includes diametrically opposed flat side portions adjacent the upper end thereof and the clip member includes diametrically opposed flat side portions sized to seat on the flat side portions of the lower spacer member tubular portion to preclude rotation of the clip member on the lower spacer member tubular portion.

According to a further feature of the invention, the extreme upper end of the lower spacer member tubular portion is flared outwardly above the flat side portions thereof to preclude upward movement of the clip member on the lower spacer member tubular portion and a radially outwardly extending shoulder provided on the lower spacer member tubular portion immediately below the flat side portions thereof to preclude downward movement of the clip member on the lower spacer member tubular portion.

According to a further feature of the invention, the lower spacer member further includes a nut member rigidly secured to the underface of the flange portion thereof in coaxial relation to the central aperture in the flange portion. This nut member, in the final assembly operation of the vehicle body to the vehicle frame using the invention vehicle mount assembly, threadably receives the lower end of a bolt passed downwardly through a hole in the vehicle body and through the aligned tubular portions of the upper and lower spacer members.

According to a further feature of the invention, the upper spacer member tubular portion includes two diametrically opposed arcuate side portions interconnected by two diametrically opposed flat side portions, corresponding to the flat side portions of the lower spacer member tubular portion and of the clip member, and the lip means comprise arcuate lips provided within the arcuate side portions adjacent the lower end of the upper spacer member tubular portion. This arrangement allows the respective flat side portions of the various members to be juxtaposed in the assembled configuration of the parts and facilitates the engagement of the lip means with the catch means on the lower spacer member.

According to a further feature of the invention, the flat side portions of the lower spacer member tubular portion are interconnected by two diametrically opposed arcuate side portions; the flat side portions of the clip member are interconnected by diametrically opposed arcuate side portions sized and configured to seat over the arcuate side portions of the lower spacer member tubular portion; and the catch means comprises outwardly projecting and downwardly extending prong portions struck from the arcuate side portions of the clip member.

According to a further feature of the invention, the split in the clip member is provided in one of the arcuate side portions thereof.

According to a further feature of the invention, after the upper and lower spacer members have been snappingly secured together, the lower spacer member is rotated relative to the upper spacer member to bring the arcuate and flat side portions of the clip member into respective interferring engagement with the flat and arcuate side portions of the upper spacer member tubular portion and thereby augment the locking interengagement between the upper and lower spacer members.

DETAILED DESCRIPTION OF THE PREFERED EMBODIMENT

Figure 1:
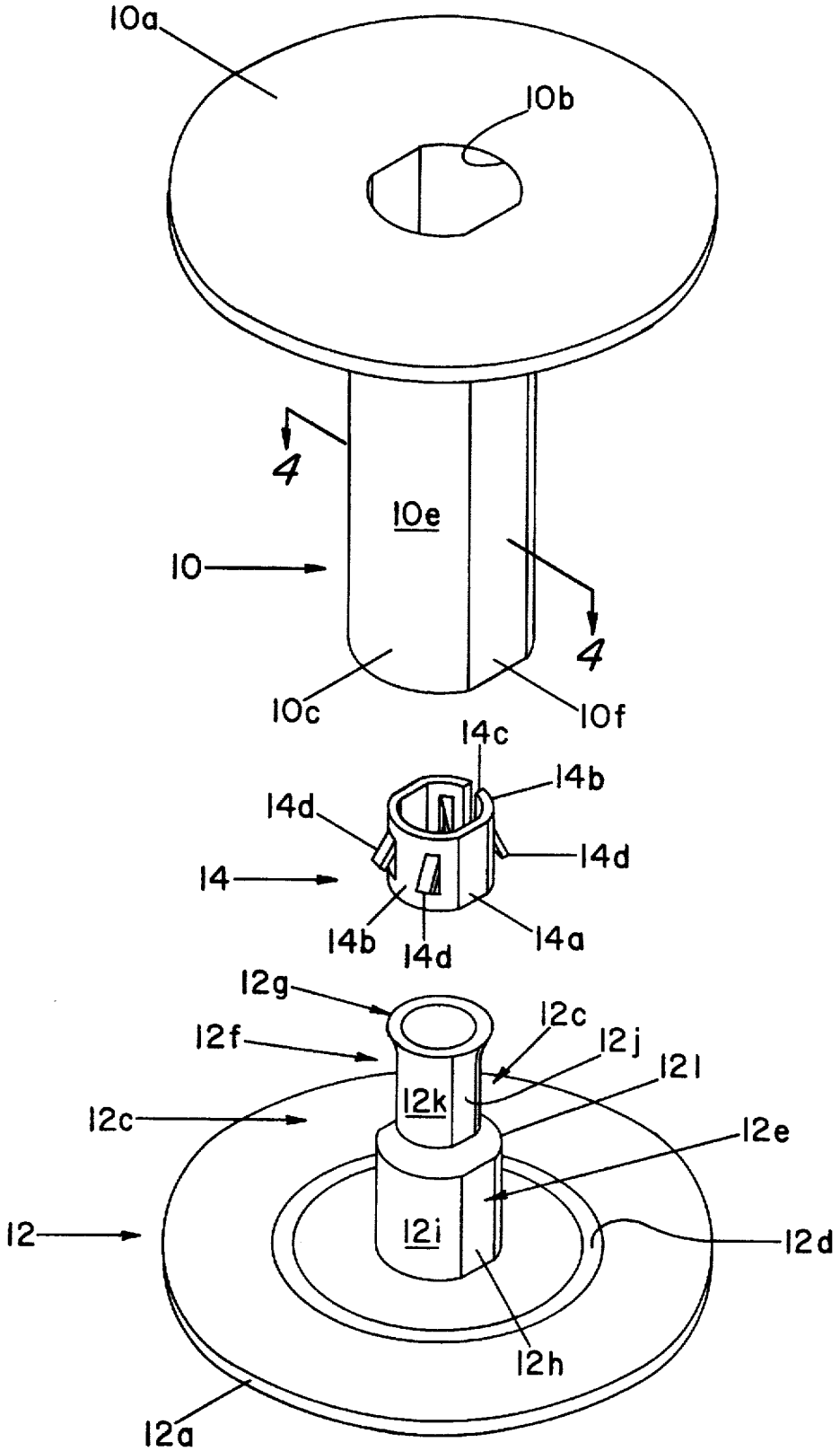
FIG. 1 is an exploded perspective view of the components of the vehicle body mount assembly of the invention.
Figure 2:
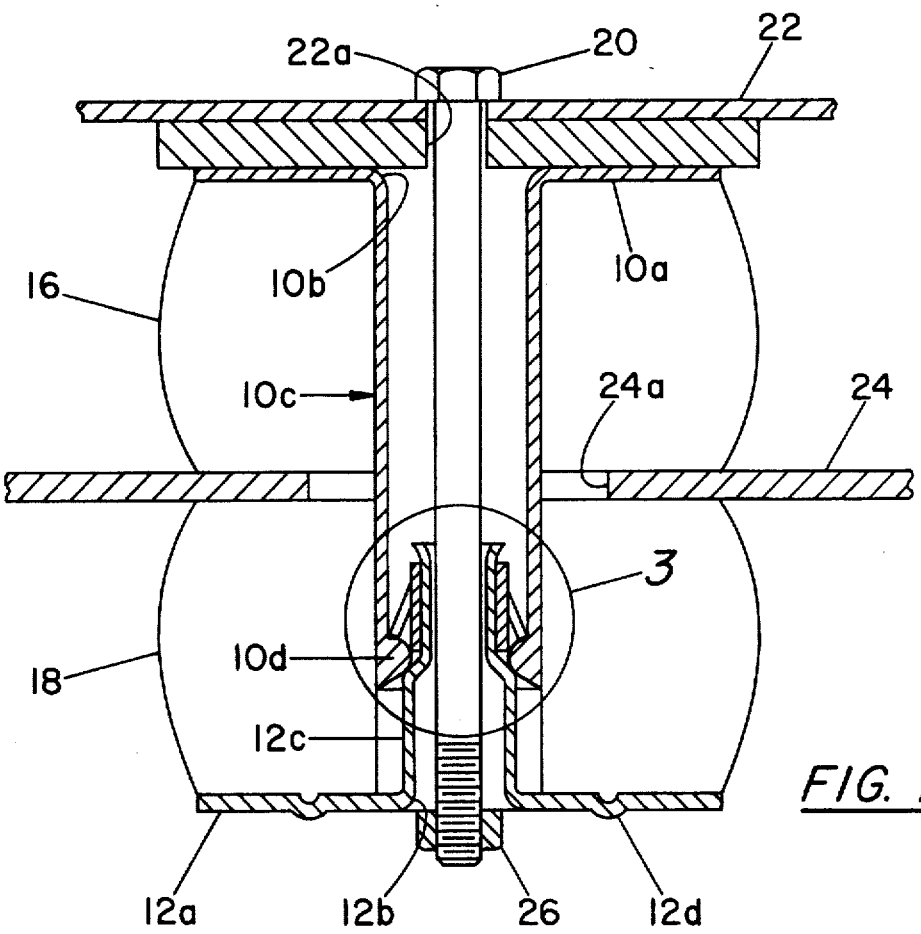
FIG. 2 is a cross-sectional view showing the invention vehicle body mount assembly as utilized in the mounting of a vehicle body to a vehicle frame.
Figure 3:
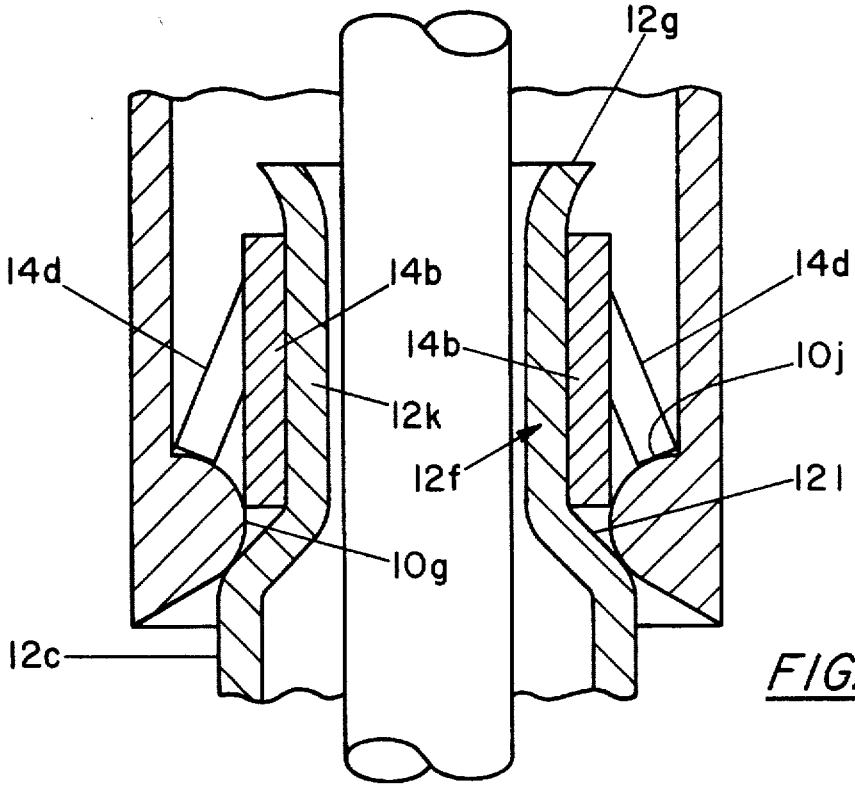
FIG. 3 is a detailed view of the area within the circle 3 of FIG. 2.
Figure 6:
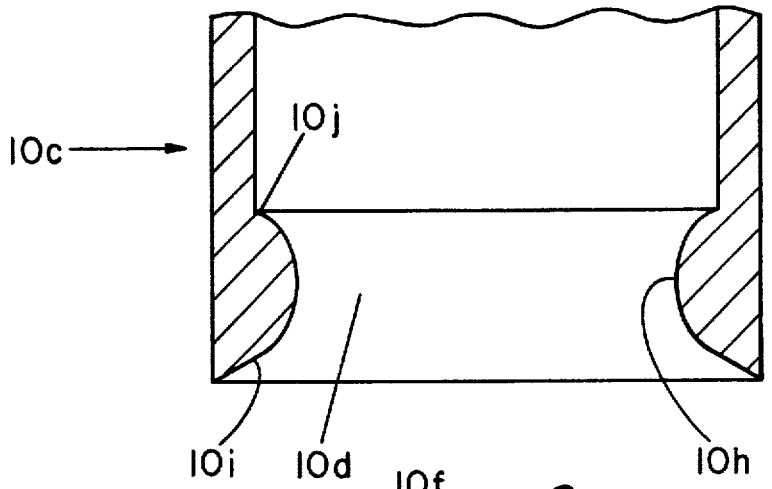
FIGS. 5 and 6 are fragmentary cross-sectional views taken respectively on lines 5—5 and 6—6 of FIG. 4.
Figure 4:
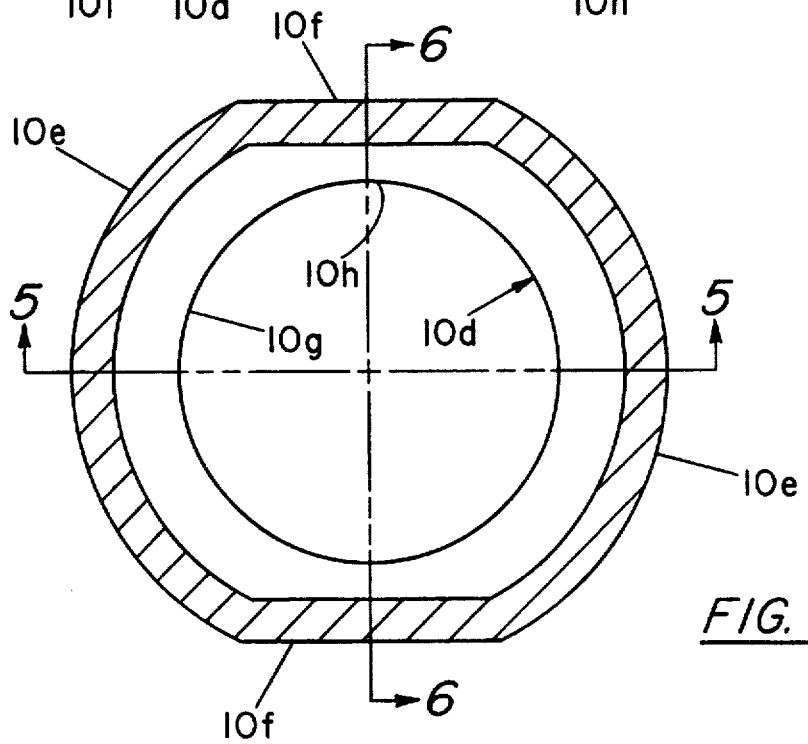
FIG. 4 is a cross-sectional view taken on line 4—4 of FIG. 1.
Figure 5:
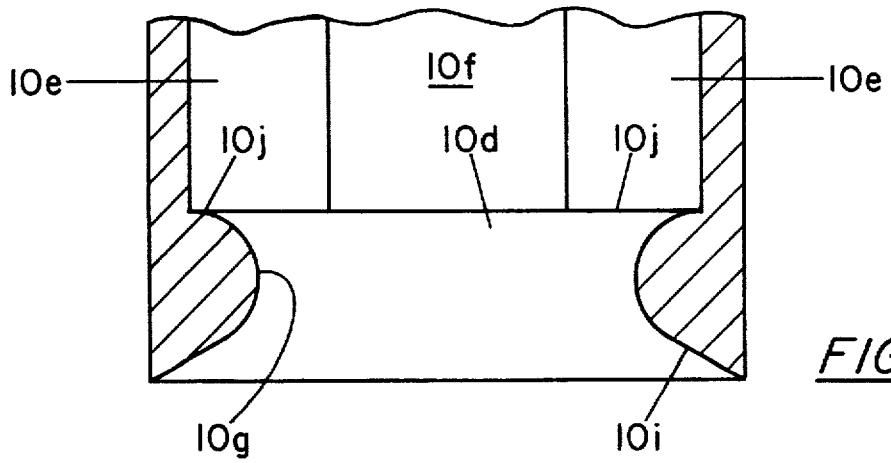

The invention vehicle body mount assembly broadly considered comprises an upper sheet metal spacer member 10, a lower sheet metal spacer member 12, and a clip member 14. Members 10, 12 and 14 may be formed in stamping operations from suitable ferrous material.

Upper spacer member 10 includes a circular flange portion 10a, having a central aperture 10b, and a tubular portion 10c extending downwardly from flange portion 10a in coaxial relation to aperture 10b. Radially inwardly extending lip means 10d is provided adjacent the lower end of tubular portion 10c.

Tubular portion 10c includes two diametrically opposed arcuate side portions 10e interconnected by two diametrically opposed flat side portions 10f. Lip means 10d is provided around the inner circumference of the lower end of tubular portion 10c and includes relatively thick lip portions 10g extending around the inner circumference of arcuate side portions 10e and relatively thin lip portions portions 10h adjacent the inner circumference of flat side portions 10f. A circumferential bevel face 10i interconnects lip means 10d with the extreme lower end of the tubular portion 10c.

Lower spacer member 12 includes a circular flange portion 12a, having a central aperture 12b, and a tubular portion 12c extending upwardly from flange portion 12a in coaxial relation to central aperture 12b and generally sized to be received telescopically within the lower end of the tubular portion 10c of the upper spacer member 10. An annular bead 12d, concentric with central aperture 12b, is provided in flange portion 12a.

Upstanding tubular portion 12c includes a base portion 12e, an attachment portion 12f, and a flared portion 12g. Base portion 12e includes diametrically opposed flat side portions 12h interconnected by diametrically opposed arcuate side portions 12i. Attachment portion 12f includes diametrically opposed flat side portions 12j interconnected by diametrically opposed arcuate portions 12k. Attachment portion 12f is of reduced diametric dimensions relative to base portion 12e and forms an annular shoulder 121 at its juncture with base portion 12e. Flare portion 12g is provided at the extreme upper end of tubular portion 12c and flares outwardly relative to attachment portion 12f. Flare portion 12g, like base portion 12e and attachment portion 12f, includes diametrically opposed flat side portions interconnected by diametrically opposed arcuate side portions so as to form a complete, outwardly flaring, conforming lip all the way around the upper end of attachment portion 12f.

Clip member 14 comprises a split ring and includes diametrically opposed flat side portions 14a interconnected by diametrically opposed arcuate side portions 14b. The split in the ring is provided at 14c in one of the arcuate side portions 14b. A pair of angularly spaced prongs 14d are struck from each arcuate side portion 14b and extend outwardly and downwardly with respect to the main body of the clip member.

The invention vehicle body mount assembly is used in cooperation with a pair of resilient, upper and lower elastomeric blocks 16, 18 and a bolt 20 to secure a vehicle body 22 to a vehicle frame 24. In the process of mounting the vehicle body to the vehicle frame, the tubular portion of the upper spacer member is passed downwardly through the central aperture in upper elastomeric block 16; the upper block and spacer member subassembly is positioned on the upper face of frame 24 with the lower end of tubular portion 10c passing downwardly through an aperture 24a in the frame; clip member 14 is seated on the attachment portion 12f of lower spacer member 12 by expanding the clip so as to enable it to pass over flare portion 12g for seating on attachment portion 12f, lower resilient block 18 is assembled to spacer member 12 and clip member 14 by passing the tubular portion 12c of the lower spacer member, with the clip member attached, upwardly into the central aperture of the lower block; and the lower block, lower spacer member, and clip member subassembly is moved upwardly to position the upper face of the lower block 18 against the underface of frame 24 and to move the upper end of tubular portion 12c, with the clip member attached, upwardly into the lower end of tubular portion 10c of the upper spacer member.

As the clip member 14 is moved upwardly within the lower end of tubular portion 10c of the upper spacer member, lip means 10d passes downwardly past the projecting prong portions 14d to squeeze the prong portions inwardly whereafter, once the lip means has cleared the prong portions, the prong portions spring outwardly to lockingly and snappingly engage with the upper annular shoulder 10j of the lip means to preclude downward movement of the lower spacer member relative to the upper spacer member.

During the upward movement of the tubular portion of the lower spacer member, together with the clip member, into the lower end of the tubular portion of the upper spacer member, flats 10f on tubular portion 10c are angularly aligned with flats 14a on the clip member and flats 12j on the tubular portion of the lower spacer member to allow the upper tubular member to clear the flare portion 12g of the lower tubular member and so that relatively thick lip portions 10g of the lip means coact with prong portions 14d as the lip means lockingly engage the prong portions. If desired, lower spacer member 12 and clip member 14 may thereafter be rotated through approximately 90° relative to the upper spacer member to bring the flat side portions of the clip member into interfering engagement with the arcuate portions of the tubular portion of the upper spacer member and to bring the arcuate side portions of the clip member into interfering engagement with the flat side portions of the tubular portion of the upper spacer member to further lock the lower spacer member with respect to the upper spacer member.

At a further point along the assembly line, the body 22 of the vehicle is positioned on the upper face of the upper flange portion of the upper spacer member and bolt 20 is passed downwardly through an aperture 22a in the body and through aligned tubular portions 10c, 12c for engagement with a nut 26 welded to the underface of flange portion 12a of lower spacer member 12 in coaxial relation to aperture 12b.

The invention vehicle body mount assembly will be seen to provide an inexpensive and effective means of quickly mounting a vehicle body to a vehicle frame without the use of skilled labor and without utilization of any special tools. Elimination of the special tools required with previous vehicle mount assemblies eliminates the capital investment with respect to such tools, eliminates the maintenance and repair with respect to such tools, and frees up valuable and expensive space along the assembly line for other purposes.

Whereas the preferred embodiment of the invention has been illustrated and described in detail it will be apparent that various changes can be made in the disclosed embodiment without departing from the scope or spirit of the invention.

I claim:

1. A vehicle body mount assembly for attaching a vehicle to a vehicle frame by the use of a pair of resilient blocks, said assembly comprising:

A) an upper sheet metal spacer member including (1) a flange portion having a central aperture, and (2) a tubular portion extending downwardly from said flange portion in coaxial relation to said central aperture and having a noncircular interior periphery surface;

B) a lower sheet metal spacer member including (1) a flange portion having a central aperture, and (2) a tubular portion extending upwardly from said flange portion in coaxial relation to the central aperture thereof and sized to be received telescopically within said upper spacer member tubular portion;

C) a clip member fitting over said tubular portion of said lower spacer member and defining a noncircular exterior peripheral surface at its exterior peripheral surface generally corresponding in size and configuration to said noncircular interior surface;

D) means operative in response to telescoping axial insertion of said lower member tubular portion into said upper member tubular portion, within said noncircular surfaces aligned, to secure said upper member to said lower member, said operative means including (1) a radially inwardly extending lip on said upper member tubular portion adjacent the lower end thereof; and (2) prongs projecting radially outwardly from said clip member for snapping coaction with said lip in response to axial insertion of said lower member tubular portion into said upper member tubular portion;

E) said noncircular exterior peripheral surface of said clip coating with said noncircular interior surface of said tubular portion of said upper spacer member in the assembled relation of the body mount assembly to preclude relative rotation of said upper and lower spacer members;

F) said prongs lockingly engaging said lip in the assembled relation of the body mount assembly to preclude relative axial movement of said upper and lower spacer members;

G) said lower spacer member tubular portion defining a first radially outwardly extending shoulder proximate its upper end and a second radially outwardly extending shoulder at a location spaced below said first shoulder and coacting with said first shoulder to define an annular external seat therebetween;

H) said clip being positioned on said annular external seat with said shoulder coacting to preclude axial movement of said clip on said lower spacer member tubular portion.

2. The vehicle body mount assembly of claim 1 wherein said lower spacer member includes a nut member rigidly secured to the underface of said flange portion thereof in coaxial relation to said central aperture of said flange portion to receive a bolt passing axially through said upper and lower spacer members.

*3. A vehicle body mount assembly for attaching a vehicle to a vehicle frame by the use of a pair of resilient blocks, said assembly comprising:*

*A) an upper spacer member including*

*(1) a flange portion having a central aperture, and*

*(2) a tubular portion extending downwardly from said flange portion in coaxial relation to said central aperture and having a noncircular interior peripheral surface;*

*B) a lower spacer member including*

*(1) a flange portion having a central aperture, and*

*(2) a tubular portion extending upwardly from said flange portion to an upper end in coaxial relation to the central aperture thereof and sized to be received telescopically within said upper spacer member tubular portion;*

*C) a clip member fitting over said tubular portion of said lower spacer member and defining a noncircular exterior peripheral surface at its exterior peripheral surface generally corresponding in size and configuration to said noncircular interior surface;*

*D) means operative response to telescoping axial insertion of said lower member tubular portion into said upper member tubular portion, with said noncircular surfaces aligned, to secure said upper member to said lower member, said operative means including*

*(1) a radially inwardly extending shoulder on said upper member tubular portion; and*

*(2) prongs projecting radially outwardly from said clip member for snapping coaction with said radially inwardly extending shoulder in response to axial insertion of said lower member tubular portion into said upper member tubular portion;*

*E) said noncircular exterior peripheral surface of said clip coacting with said noncircular interior surface of said tubular portion of said upper spacer member in the assembled relation of the body mount assembly to preclude relative rotation of said upper and lower spacer members;*

*F) said prongs lockingly engaging said radially inwardly extending shoulder in the assembled relation of the body mount assembly to preclude relative axial movement of said upper and lower spacer members;*

*G) said lower spacer member tubular portion defining an annular seat;*

*H) said clip being positioned on said annular seat with means precluding axial movement of said clip on said lower spacer member tubular portion.*

*4. The vehicle body mount assembly of claim 3 wherein*

*the means precluding axial movement of said clip on said lower spacer member tubular portion includes a radially outwardly extending shoulder on said tubular portion spaced below said upper end.*

*5. The vehicle body mount assembly of claim 4 wherein said annular seat is on an external peripheral surface of the tubular portion of said lower spacer member.*

*6. A vehicle body mount assembly for attaching a vehicle to a vehicle frame by the use of a pair of resilient blocks, said assembly comprising:*

*A) an upper spacer member including*

*(1) a flange portion having a central aperture, and*

*(2) a tubular portion extending downwardly from said flange portion in coaxial relation to said central aperture and having a noncircular interior peripheral surface;*

*B) a lower spacer member including*

*(1) a flange portion having a central aperture, and*

*(2) a tubular portion extending upwardly from said flange portion to an upper end in coaxial relation to the central aperture thereof and sized to be received telescopically within said upper spacer member tubular portion;*

*C) a clip member fitting over said tubular portion of said lower spacer member and defining a noncircular exterior peripheral surface at its exterior peripheral surface generally corresponding in size and configuration to said noncircular interior surface;*

*D) means operative in response to telescoping axial insertion of said lower member tubular portion into said upper member tubular portion, with said noncircular surfaces aligned, to secure said upper member to said lower member, said operative means including*

*(1) a radially inwardly extending shoulder on said upper member tubular portion; and*

*(2) prongs projecting radially outwardly from said clip member for snapping coaction with said radially inwardly extending shoulder in response to axial insertion of said lower member tubular portion into said upper member tubular portion;*

*E) said noncircular exterior peripheral surface of said clip coacting with said noncircular interior surface of said tubular portion of said upper spacer member in the assembled relation of the body mount assembly to preclude relative rotation of said upper and lower spacer members;*

*F) said prongs lockingly engaging said radially inwardly extending shoulder in the assembled relation of the body mount assembly to preclude relative axial movement of said upper and lower spacer members;*

*G) a radially outwardly extending shoulder at a midpoint of said lower spacer member tubular portion and defining with said upper end an annular seat therebetween;*

*H) said clip being positioned on said annular seat with said radially outwardly extending shoulder and said upper end coacting to preclude axial movement of said clip on said lower spacer member tubular portion.*

* * * * *